Nov. 6, 1945.   J. A. BOYAJIAN   2,388,595
AUTOMATIC PHONOGRAPH
Filed March 3, 1939   13 Sheets-Sheet 1

Inventor:
James A. Boyajian
BY Williams, Bradbury, McCaleb & Hinkle
Attys.

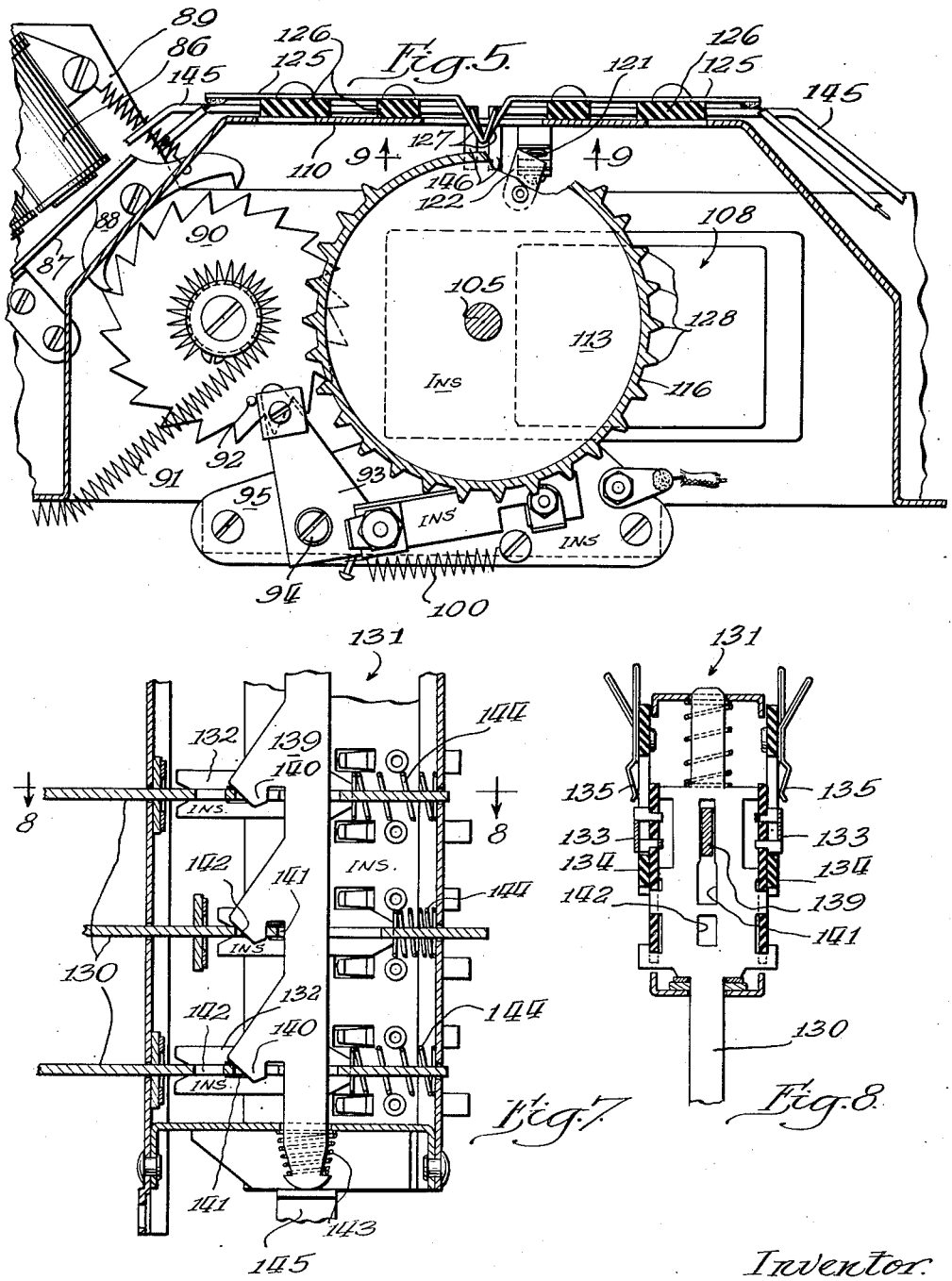

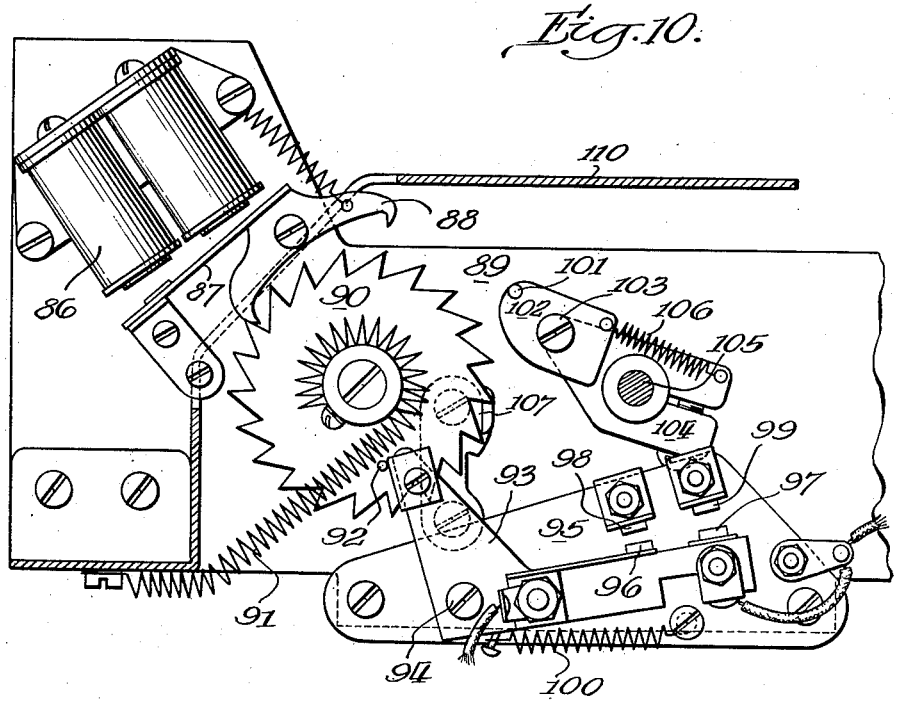
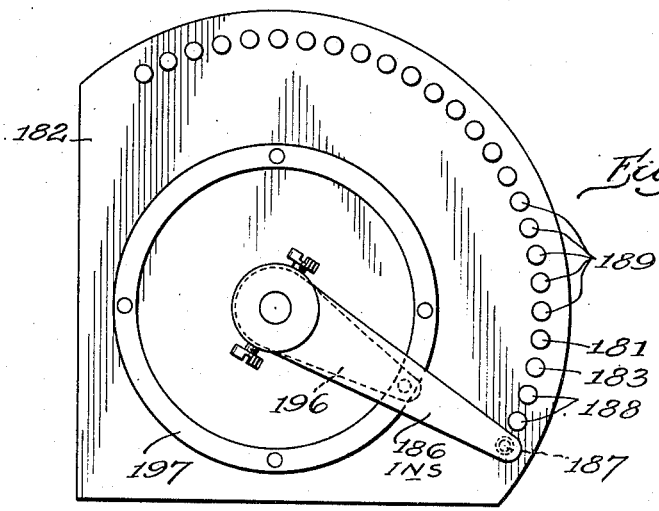

Nov. 6, 1945.   J. A. BOYAJIAN   2,388,595
AUTOMATIC PHONOGRAPH
Filed March 3, 1939   13 Sheets-Sheet 7
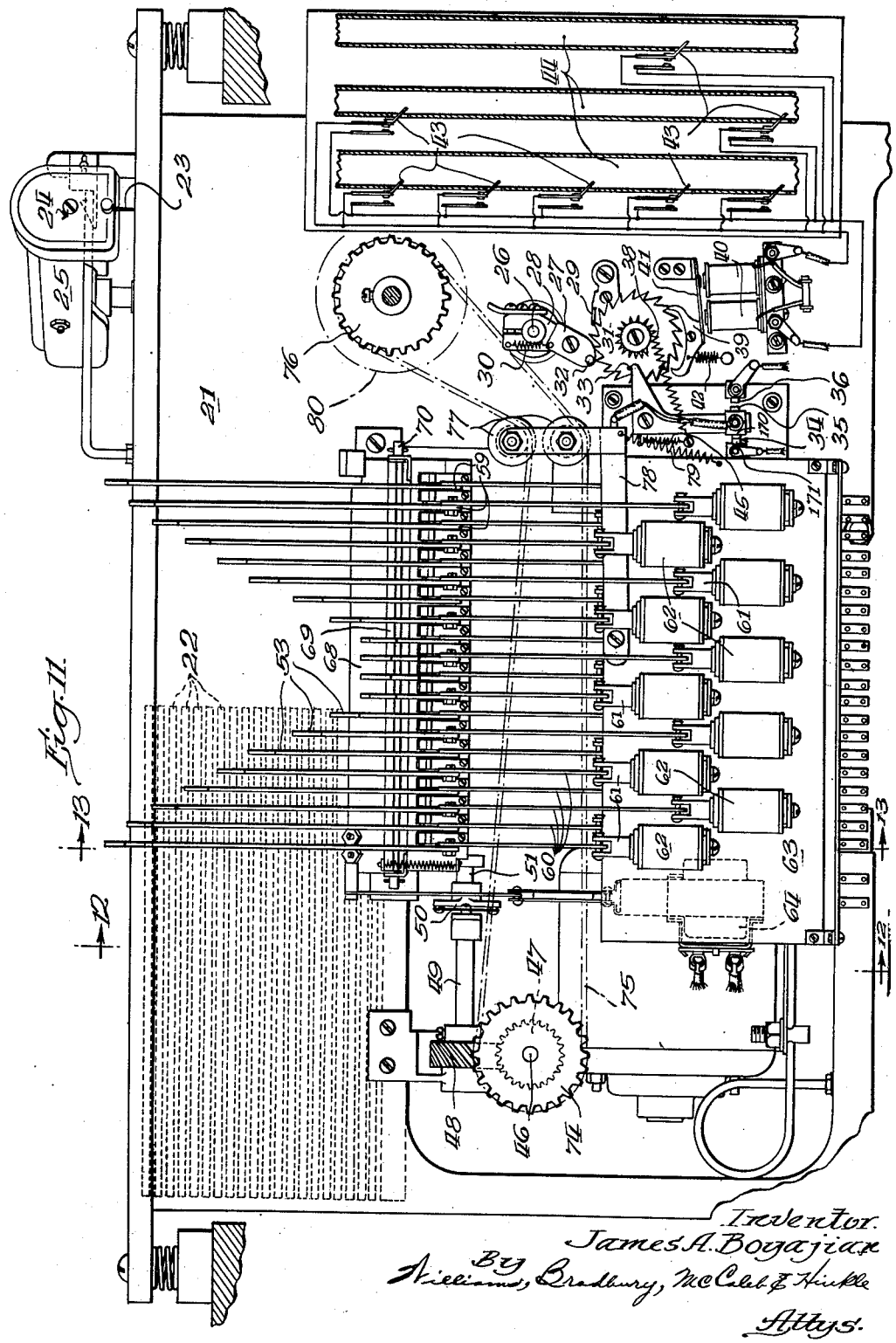

Nov. 6, 1945.     J. A. BOYAJIAN     2,388,595
AUTOMATIC PHONOGRAPH
Filed March 3, 1939     13 Sheets-Sheet 8

Inventor:
James A. Boyajian
By Williams, Bradbury,
McCaleb & Hinkle
Attys

Nov. 6, 1945.    J. A. BOYAJIAN    2,388,595
AUTOMATIC PHONOGRAPH
Filed March 3, 1939    13 Sheets-Sheet 10

Nov. 6, 1945.  J. A. BOYAJIAN  2,388,595
AUTOMATIC PHONOGRAPH
Filed March 3, 1939   13 Sheets-Sheet 11

Inventor.
James A. Boyajian
By Williams, Bradbury,
McCalet & Hinkel.
Attys.

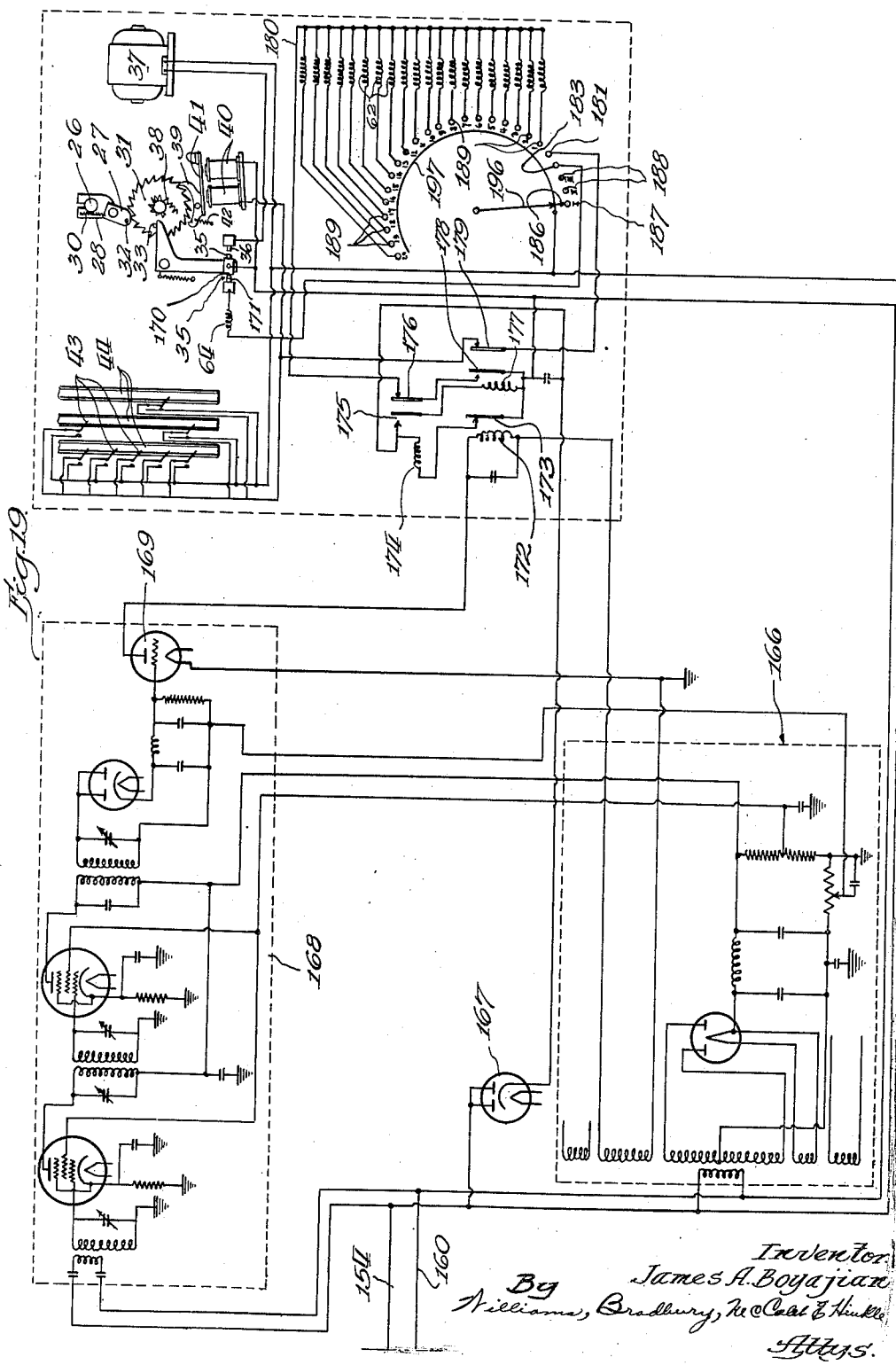

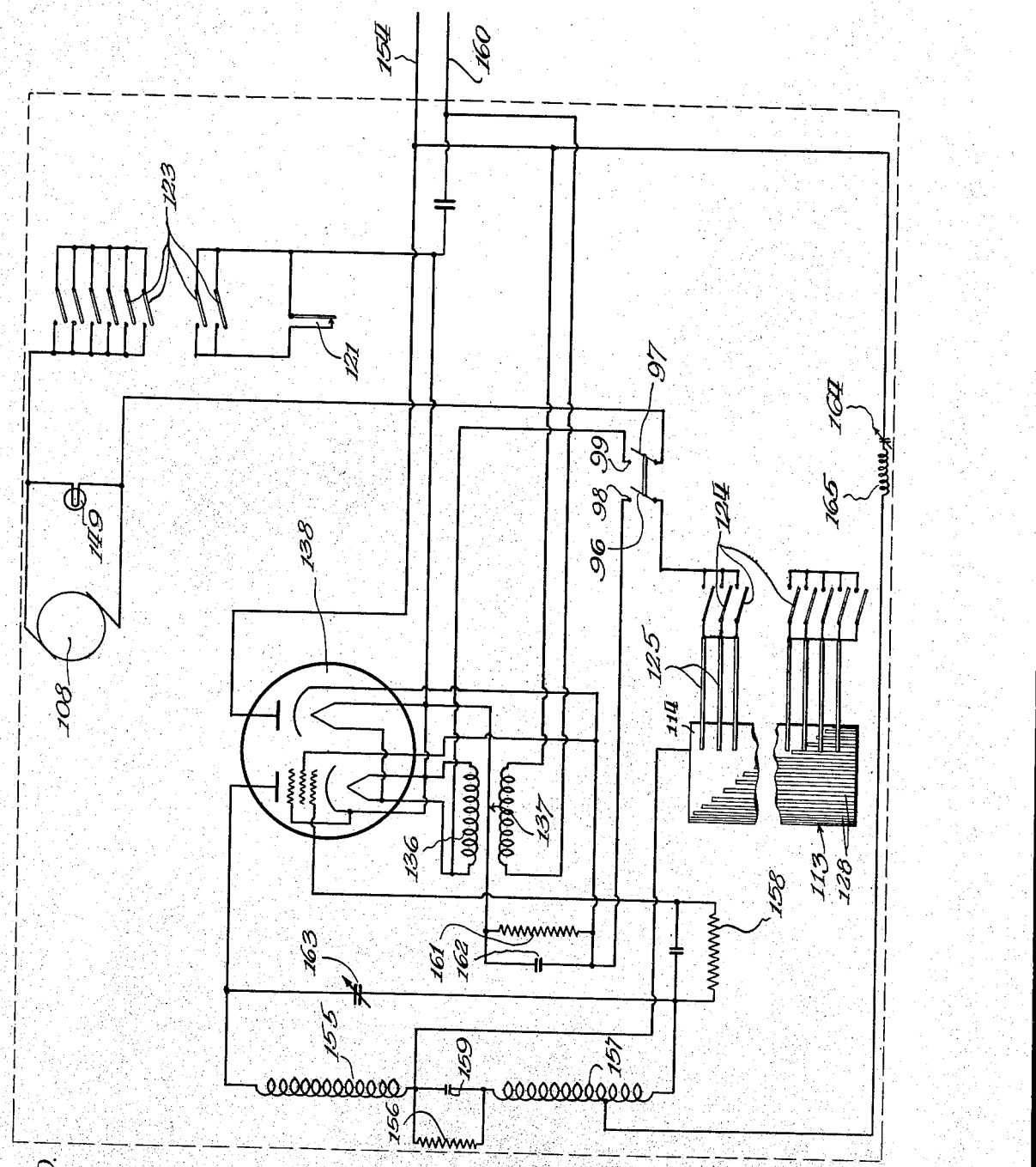

Patented Nov. 6, 1945

2,388,595

UNITED STATES PATENT OFFICE 2,388,595

AUTOMATIC PHONOGRAPH

James A. Boyajian, Chicago, Ill., assignor to J. P. Seeburg Corporation, a corporation of Illinois Application March 3, 1939, Serial No. 259,586

28 Claims. (Cl. 194—15)

This invention relates to automatic phonographs and particularly to such phonographs which are adapted to be put into operation by the insertion of a coin or coins so as to play one selection or a plurality of selections depending in number upon the number or value of coins inserted, and which are provided with selector means whereby any particular selections to be played can be predetermined by the operator.

The invention more particularly relates to remote control means and means adjacent a phonograph whereby such a phonograph may be put into operation by the insertion of coins and the records to be played may be selected at a location or locations remote from the phonograph.

One of the objects of the invention is to provide an improved phonograph comprising elements at a remote position for transmitting a controllable number of impulses of high frequency energy and means adjacent the phonograph for receiving said impulses and selecting a desired recording to be played.

A further object of the invention is to provide an improved phonograph including a main unit and a remote unit connected together by power lines and adapted to transmit signals over the power lines for the selection of a desired recording or recordings to be played.

A further object of the invention is to provide an automatic phonograph including a main unit and a remote control unit having cooperative selector mechanism in both units, said elements in the remote unit being adapted to transmit impulses of radio frequency corresponding to a recording to be played and said elements in the main unit being adapted to receive said impulses and to control the playing of the recording selected.

A further object of the invention is to provide an automatic phonograph including a remote control unit and a main unit and selector means in both units adapted to cooperate by high frequency signals whereby recordings to be played may be selected at the remote control unit and credit may be transferred from the remote unit to the main unit by means of high frequency impulses.

A further object of the invention is to provide an improved automatic phonograph including a main unit and a remote control unit, which are adapted to be installed in a building and operatively connected through the power wires in the building.

Other objects, advantages and capabilities of the invention will appear from the following description of a preferred embodiment thereof.

For simplicity of description, the present invention is described in connection with a phonograph of the type described and claimed in application Serial No. 161,906, filed September 1, 1937, by Carl G. Freborg. It will, however, be understood that the invention may be used with other known types of multi-selecting automatic phonographs.

The invention will readily be understood from the following description of a preferred embodiment thereof, taken in conjunction with the accompanying drawings, in which:

Fig. 4 is a sectional plan view, the section being taken on the broken line 4—4 of Fig. 2;

Fig. 5 is a sectional detail plan view, the section being taken on the line 5—5 of Fig. 1;

Fig. 6 is a sectional detail view of part of the selector mechanism, the section being taken on the line 6—6 of Fig. 4;

Fig. 7 is a similar view, the section being taken on the line 7—7 of Fig. 4;

Fig. 8 is a sectional detail, taken on the line 8—8 of Fig. 7;

Fig. 9 is a fragmentary sectional detail view, taken on the line 9—9 of Fig. 5;

Fig. 10 is a sectional detail view, taken on the line 10—10 of Fig. 1, showing the accumulator switch;

Fig. 11 is a front elevational view of a phonograph embodying my invention, the housing of the phonograph being removed to disclose details of the machine and certain parts of the machine being shown in section;

Fig. 18 is a front elevational view of the selector switch;

Fig. 19 is a wiring diagram showing the electrical system of the phonograph; and Fig. 20 is a wiring diagram showing the electrical system of the remote control.

Figure 12:
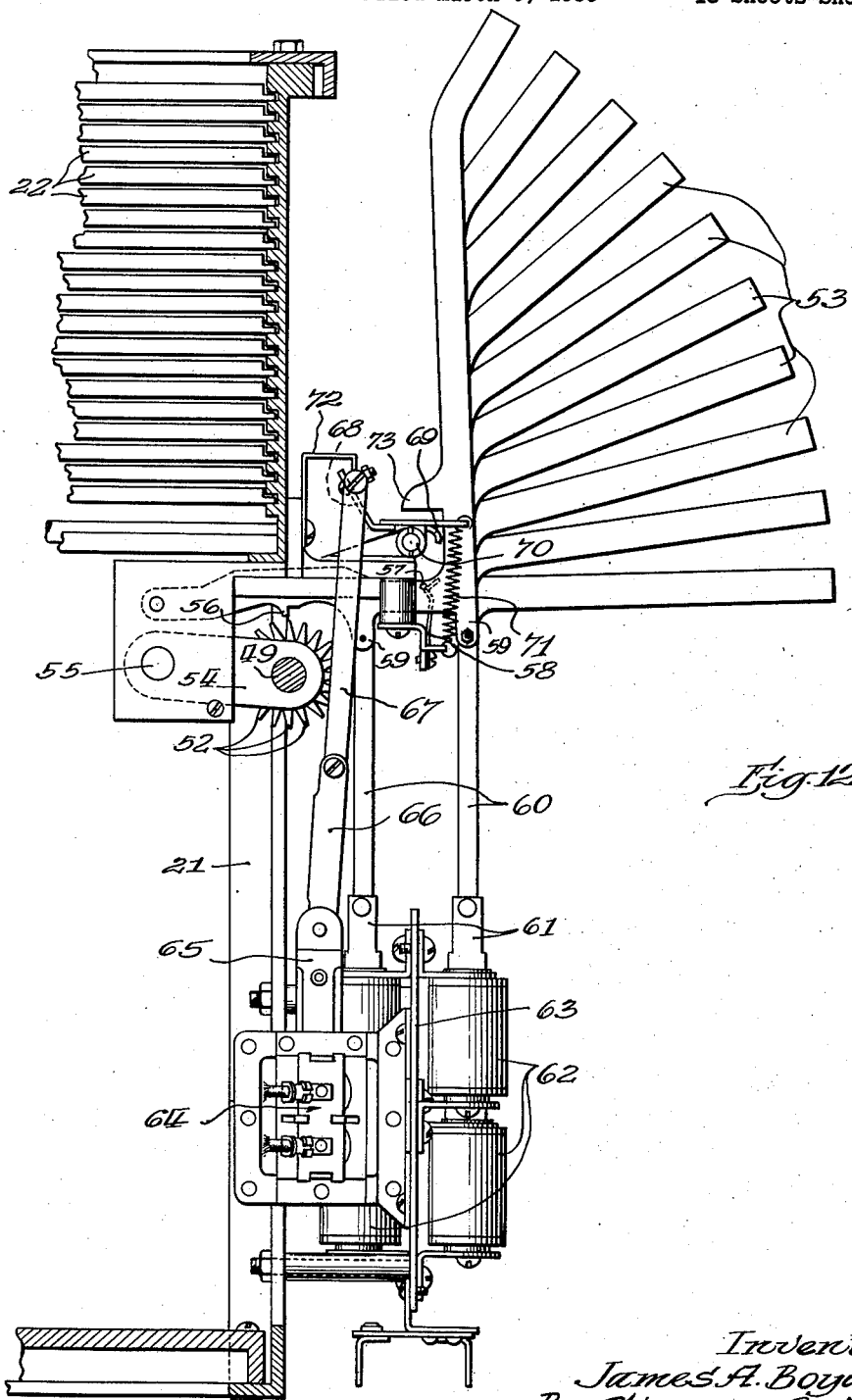
Fig. 12 is a fragmentary sectional view through the phonograph, the section being taken on the line 12—12 of Fig. 11.
Figure 13:
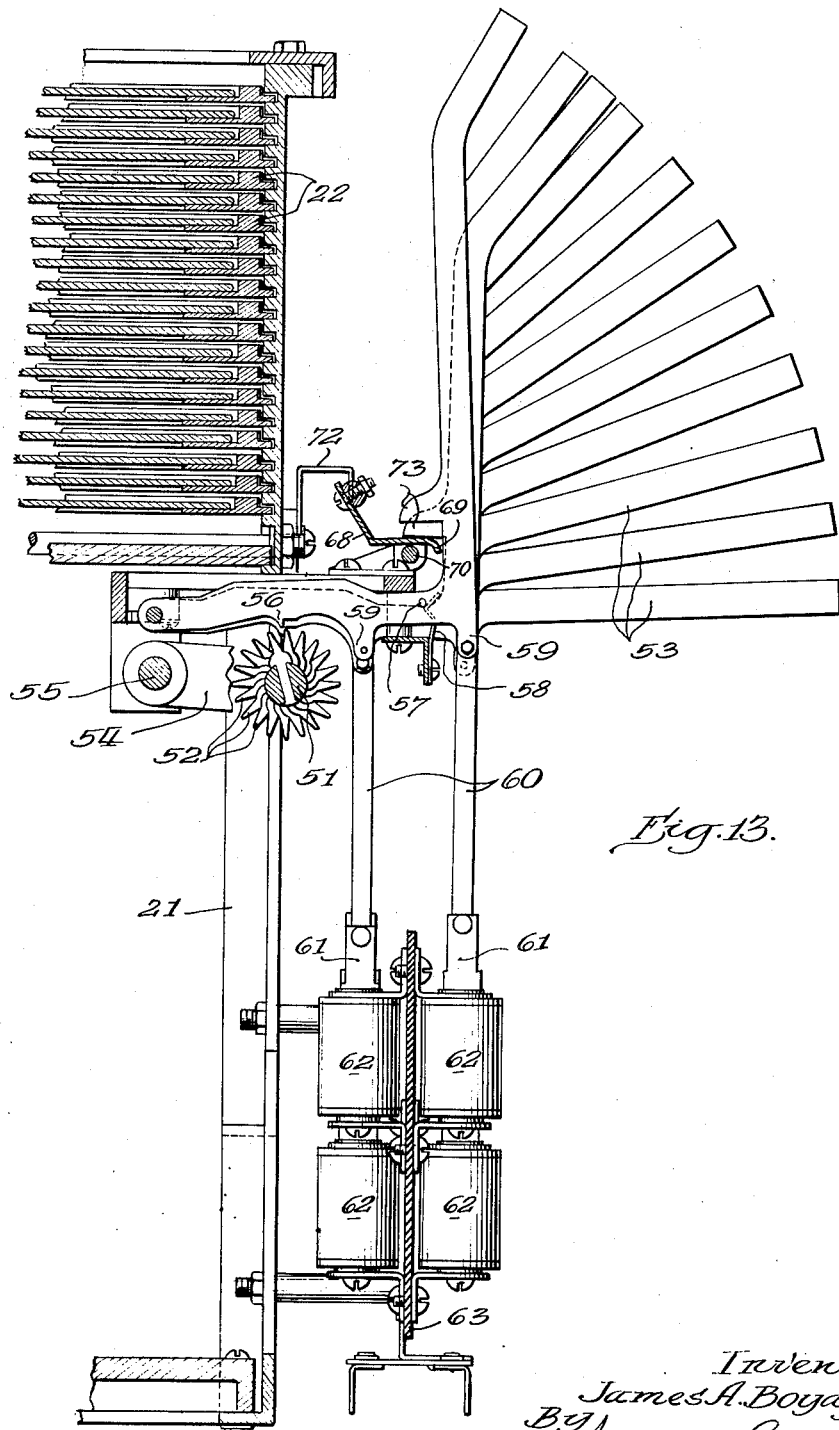
Fig. 13 is a similar view, the section being taken on the line 13—13 of Fig. 11, and one of the selector elements being shown in a selecting position.

Referring to the drawings, the automatic phonograph referred to above and illustrated in Figs. 11, 12 and 13, is substantially similar to and operates in substantially the same way as described in patent application Serial No. 161,906 previously referred to. It is, therefore, not necessary to describe the complete machine, but it is sufficient to emphasize those parts which are modified or added to the machine described in that application.

The phonograph comprises a frame 21 in which are mounted a plurality of sliding frames 22 which are adapted to be slid individually to the right as viewed in Fig. 11, into alignment with a turntable, not shown. The turntable automatically rises, bringing the record on the individual carrier 22 upwardly into contact with a needle 23 of a pick-up 24 which is carried by the arm 25.

At the end of the playing of a record, means controlled by the tone arm 25 are brought into operation for effecting the record changing cycle which is controlled by the single rotation of a cam shaft 26. During this cycle the turntable descends, the player arm 25 is moved to initial playing position, which is the position in which it is shown in Fig. 11, and the member 27, which is pivotally mounted on an arm 28, snaps off the abutment 29 into the position in which it is shown in Fig. 11, into which position it is biased by a spring 30. In so doing the ratchet 31 of the accumulator switch is moved one tooth in counterclockwise direction, as viewed in Fig. 11, this ratchet being engaged by the pin 32 carried by the member 27.

If this movement of the ratchet wheel 31 moves the pin 33 which is mounted on the ratchet wheel into engagement with the switch member 34, the contact 35 on that switch member is moved away from the contact 36 and the circuit to the motor 37 is broken. If, however, the pin 33 does not make contact with the switch member 34, the motor 37 continues to operate, the record carrier 22 is returned to the stack and a new carrier 22 is moved outwardly into alignment with the turntable and the turntable rises to carry the record into engagement with the needle 23. In this way a series of records may be played until eventually the switch arm 34 is moved away by the pin 33.

The ratchet wheel 31 is biased in the clockwise direction by means of a spring 38. It is normally held against rotation in this direction by means of an escapement member 39. This escapement member is adapted to be actuated to permit the ratchet wheel 31 to rotate step-by-step in the clockwise direction by means of an electromagnet 40. This electromagnet is located adjacent an armature 41 which is connected to the escapement member 39 which is pivotally mounted at an intermediate point as shown in Fig. 11.

It will readily be understood that each time the electromagnet 40 is energized, the escapement member 39 may be turned in clockwise direction against the action of a spring 42. When the electromagnet 40 becomes deenergized, the escapement member 39 returns to its normal position and the net result is that the ratchet wheel moves one tooth in the clockwise direction each time that the electromagnet is energized.

The electromagnet is energized by means of switches 43 which are closed by means of coins descending through coin chutes 44. These switches and coin chutes are well known in the art and are illustrated diagrammatically only in Fig. 11. It will be noted that if a nickel passes downwardly through the coin slot on the right-hand side, the ratchet wheel 31 will be turned one tooth in the clockwise direction. This initial movement of the ratchet wheel 31 permits the spring 45 to move the switch member 34 to switch-closing position, thus starting the motor. It may here be noted that when the switch lever 34 is in open position a contact 170, which is electrically connected to the contact 35, engages a contact 171.

The left-hand one of the three coin chutes is provided with five switches and it will be readily understood that this coin chute is intended for quarters. A quarter passing down this coin chute closes five switches 43 in succession and the magnet 40 is energized five times in succession, thus moving the ratchet wheel 31 five teeth in the clockwise direction.

The middle coin chute shown in Fig. 11 contains two switches and is intended to receive dimes, each dime moving the ratchet wheel 31 two teeth in the clockwise direction.

It may be stated that if the ratchet wheel 31 is displaced a certain number of teeth in the clockwise direction by the insertion of a suitable coin or coins into the chutes 44, the phonograph will play the corresponding number of selections, the ratchet wheel 31 being returned one tooth in the counterclockwise direction after the playing of each selection. Finally, when the last selection is played, the pin 33 engages the switch member 34 and swings it into switch-opening position as shown in Fig. 11.

During each record-changing cycle, that is, during each rotation of the shaft 26, means (not shown) associated with this shaft, and including a frictional drive, actuate mechanism for predetermining the next record to be played. Last said mechanism is connected to a shaft 46 which is operatively connected by gears 47 and 48 to a shaft 49. The shaft 49 is connected by a universal joint 50 to a selector shaft 51.

The selector shaft 51 is provided with a helical series of pins 52. The pins 52 are located equidistantly in the longitudinal direction of the shaft 51 and the pins are progressively displaced by angular amounts along the series. The pins 52 correspond in number to the number of records. In the case illustrated, twenty records are employed and the shaft 51 is provided with twenty pins 52. The pins 52 are spaced corresponding to the selector levers 53 (Fig. 11) and adjacent pins are displaced 18 degrees one from another in the manner shown in Fig. 13; that is, taking the position of the left-hand pin, as viewed in Fig. 11, as zero, then the second pin is displaced from the zero direction by 18 degrees in the clockwise direction, as viewed in Fig. 13.

The shaft 51 is mounted in bearings which are carried by arms 54 which are rigidly carried by a shaft 55 pivotally mounted on part of the frame of the machine. The selector arms 53 are also pivoted on the frame of the machine and are arranged to project out beyond the front of the machine.

The present arms 53 differ from the corresponding arms of the above identified application in that their outer ends are relatively displaced fanwise, as shown in Figs. 12 and 13. Nevertheless, their operation is essentially the same. Each arm 53 is associated with a particular record and when that arm is depressed the associated record will be played next. Each arm is provided with a downward projection 56 which is normally located out of the path of the associated pin 52 which is in alignment with it, as best seen in Fig. 12. When, however, one of the arms 53 is depressed, for example, the second arm from the left as shown in Fig. 13, its projection 56 is brought into the path of the associated pin 52, that is, the second pin from the left. Each arm 53 is provided with a pin 57 which is adapted to cooperate with a resilient comb-like member 58, as shown in Fig. 13. The result of this cooperation is that the member 58 holds each arm 53 in its upward or downward position.

In the normal operation of the machine, that is, the operation of the machine without the depression of any of the arms 53, the selector mechanism (not shown) which predetermines the next record to be played is actuated by the shaft 26 so as to rotate the shaft 51 a complete revolution and an additional 18 degrees. This will bring the selector mechanism (not shown) into position to play the next record in the stack and it will bring each pin 52 successively into the position in which it is directed towards the projection 56 of its arm 53. Consequently, the records will be played in succession as long as none of the arms 53 is depressed. In the event, however, that one of the arms 53 is depressed, the shaft 51 is not permitted to rotate one revolution and an additional 18 degrees. It is arrested by the engagement of the projection 56 of the depressed arm 53 by the corresponding pin 52.

The selector mechanism (not shown) is likewise arrested, this arrestment being permitted by the frictional drive previously referred to and consequently the record corresponding to the depressed arm 53 is played.

After the selected record is moved into playing position, means (not shown) controlled by the shaft 26 oscillate the shaft 55 in the clockwise and counter-clockwise directions as viewed in Fig. 13. The result is that the particular arm 53, whose projection 56 is in engagement with its pin 52, is displaced upwardly and is thereby returned to normal position. In the event that a plurality of the arms 53 have been pressed downwardly, the others are not interfered with since only one pin 52 is in engagement with one arm 53.

Each of the arms 53 is provided with two downward extensions 59. To one of these extensions of each of the arms 53 is connected an individual link 60. These links extend downwardly and each is connected to the armature 61 of a solenoid 62. These solenoids are mounted, as shown in Figs. 11, 12 and 13, on a plate 63 mounted on the front of the chassis. The manner in which the solenoids 62 are energized will hereinafter be more fully described. The plate 63 also carries a solenoid 64 which is provided with the armature 65. This armature is connected by links 66 and 67 to an extension 68 carried by a discharge bar 69.

The discharge bar 69 is pivotally mounted on a shaft 70 and is biased downwardly by a spring 71. The downward movement of the bar 69 is limited by engagement of its rear extension 68 with a stop 72 carried by the chassis. It will readily be understood that when the solenoid 64 is energized, which is effected in the manner hereinafter described, the bar 69 will be swung upwardly from its position shown in Figs. 11, 12 and 13, and when the solenoid 64 becomes de-energized, the spring 71 returns the bar 69 to its normal position.

Each of the arms 53 is provided with a rearwardly directed projection 73. The projections 73 of the arms 53 are locked in horizontal alignment and are normally somewhat above the position of the bar 69, as is best seen in Fig. 12. When one or more of the arms 53 is or are depressed, the projection or projections 73 thereof move downwardly into a position adjacent the bar 69. This is best seen in Fig. 13, where the second arm 53 from the left as viewed from the front of the machine is shown in depressed condition. It will readily be understood that when the bar 69 is oscillated by the energization of the solenoid 64, the depressed arms 53 are elevated into their normal position.

The shaft 46 may carry thereon at its forward end a sprocket wheel 74 which is connected by means of a sprocket chain 75 to a sprocket wheel 76. The sprocket chain 75 may pass around suitable idlers 77 which are carried by a pivoted arm 78. The arm 78 is pulled downwardly by a spring 79 so as to maintain the chain 75 under suitable tension. The sprocket wheel 76 may be rigidly connected to an indicating card 80 which cooperates with suitable means (not shown) for indicating which record is being played.

From the foregoing description it will readily be understood that when one or more coins is or are inserted by means of any of the coin chutes 44, the machine will be put into operation and that a plurality of records corresponding to the value of the coins inserted will be played in sequence by the phonograph. If a similar number of arms 53 are depressed, then the machine will play the selections corresponding to the arms 53 which are then depressed. This general operation of the machine will be readily understood from the patent application hereinabove referred to.

In addition to this manner of operation, the machine is adapted to be operated by one or more remote control units, the nature of which will now be described.

Figure 1:
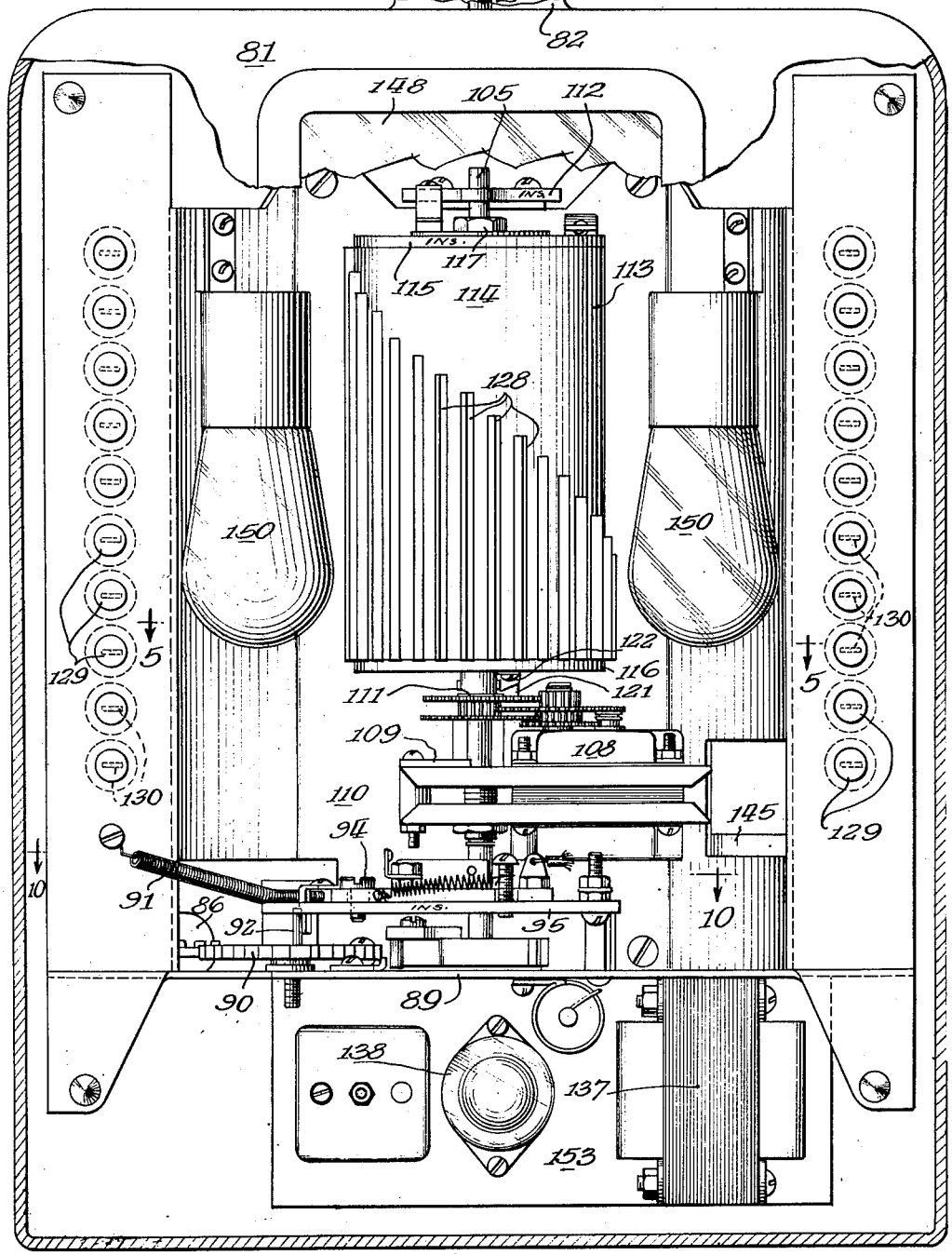
Figure 1 is an elevational view, the front wall being broken away, of a remote control unit embodying my invention.
Figure 2:
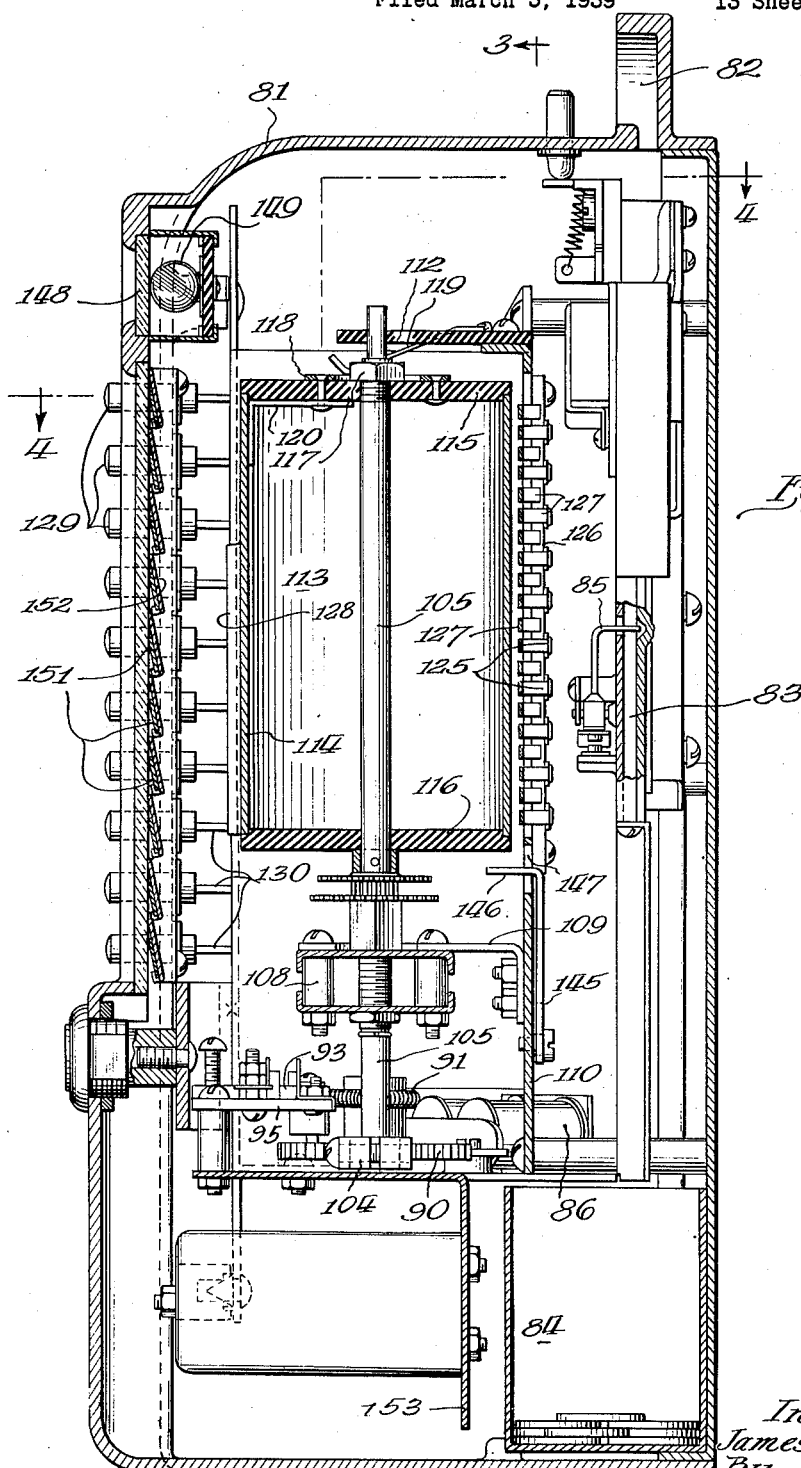
Fig. 2 is a sectional elevational view thereof, the section being taken on the line 2—2 of Fig. 1.
Figure 3:
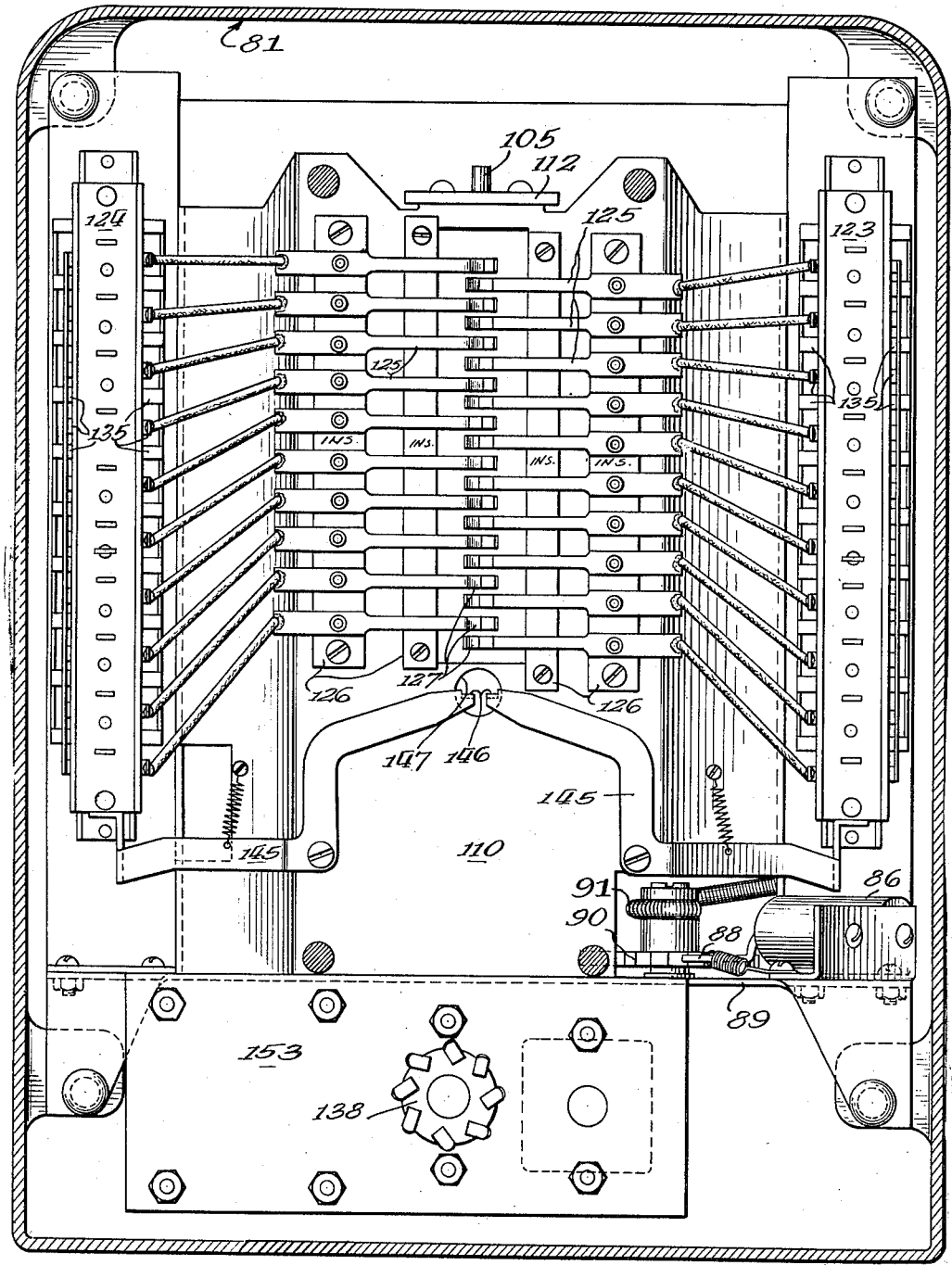
Fig. 3 is a sectional elevational view of the remote control unit looking towards the front of the unit, the section being taken on the line 3—3 of Fig. 2.

The remote control unit shown in the drawings and particularly shown in Figs. 1 and 2 comprises a housing 81, which housing is provided with a coin slot 82. This coin slot delivers the coin into a coin chute 83 through which it passes to a coin box 84 in the bottom of the housing. In passing downwardly through this coin chute the coin closes a switch 85 which energizes an electromagnet 86. This electromagnet is provided with an armature 87 which is integral with an escapement member 88. This escapement member is pivotally mounted on a shelf 89 which is located within the housing some distance above the bottom thereof.

The escapement member 88 cooperates with a ratchet wheel 90 which is generally similar to the ratchet wheel 31 previously described. This ratchet wheel 90 is biased in the clockwise direction, as viewed in Fig. 5, by means of a spring 91. It will readily be understood that each time the electromagnet 86 is energized the escapement member 88 is oscillated to and fro, with the result that the ratchet wheel 90 moves the distance of one tooth in the clockwise direction.

It will readily be understood that the coin slot 82, coin chute 83 and switch 85 may be replaced by means for receiving a plurality of coins of different denominations on the general lines of the coin chutes 44 and switches 43 shown diagrammatically in Fig. 11. It will be understood that if a plurality of coins or one coin of higher denomination is inserted in such a coin chute, the ratchet wheel 90 may be moved by a plurality of teeth from its initial position. When the remote control unit is in its initial condition or normal position, the ratchet wheel 90 is in the position shown in Fig. 10.

The ratchet wheel is provided with a pin 92 which is in engagement with one arm of a bell crank lever 93 maintaining this bell crank lever in the position in which it is shown in Fig. 10. The bell crank lever 93 is pivotally mounted by a pivot 94 on a base 95 which is mounted on the shelf 89. The lever 93 and the base 95 may suitably be of insulating material.

The lever 93 carries contacts 96 and 97 which are adapted to engage contacts 98 and 99, respectively, which latter contacts are mounted on the base 95. The bell crank lever 93 is biased toward contact engaging position by means of a spring 100, with the result that the contacts 96 and 97 engage the contacts 98 and 99, respectively, except when the lever 93 is moved into its position shown in Fig. 10 by the pin 92. It will readily be understood that when one or more coins are inserted in the coin chute, the ratchet wheel 90 is displaced by the corresponding number of teeth in the clockwise direction. The pin 92 is thereupon moved away from the lever 93 with the result that the spring 100 moves this lever into contact engaging position.

It is convenient here to note that the ratchet wheel 90 is returned step by step to its initial position by means of a pin 101. This pin projects downwardly from a block 102 which is pivotally mounted by a screw 103 on a block 104. The block 104 is rigidly mounted at the lower end of main shaft 105. The block 102 is held relative to the block 104 in the manner shown in Fig. 10, by means of a spring 106.

When the shaft rotates in the clockwise direction one revolution from its position shown in Fig. 10, the pin 101 engages an anvil member 107 mounted on the shelf 89 below the ratchet wheel 90. The anvil member 107 is so located that it displaces the block 102 about its pivot in the counter-clockwise direction as the shaft 105 rotates. At a certain point of this rotation the pin 101 clears the anvil member 107, with the result that the block 102 snaps past the ratchet wheel 90 under the influence of the spring 106, rotating the ratchet wheel 90 the distance of one tooth in the counter-clockwise direction. The rotation of the shaft 105 may be repeated at intervals in a manner hereinafter described until the last stepwise movement of the ratchet wheel 90 in the clockwise direction brings the pin 92 into engagement with the lever 93 whereby that lever is moved to circuit-breaking position.

The shaft 105 extends upwardly through a motor 108 which is carried by means of a bracket 109 from a vertical wall 110 within the housing 81. The motor is operatively connected by reducing gearing, some of which may be mounted on the shaft 105 to a gear 111 rigidly mounted on the shaft. The upper end of the shaft is rotatably supported by means of a strip of insulation 112 which extends forwardly from the wall 110.

Upon the shaft 105 is rigidly mounted a drum 113. This drum comprises a cylindrical metal wall 114 and two end pieces 115 and 116. The end walls 115 and 116 may suitably be of insulating material which have portions which extend part way into the cylindrical wall 114. The drum is assembled together by means of a nut 117 which engages a threaded portion of the shaft 105 so as to force the drum against the hub of the gear 111. Upon the upper end wall 115 is mounted a metal ring 118 which is engaged by a brush 119. The ring 118 is connected by suitable means, for example the strip 120 to the cylindrical wall 114.

The drum 113 is normally arrested by the opening of a normally closed leaf switch 121 (Figs. 5 and 9) by a projection 122 (Figs. 5 and 9) mounted on the lower end of the cylinder. When the switch 121 is held open by the projection 122 and one of the switches 123 is closed, the motor is put into operation. The projection 122 moves away from the switch 121 so that it closes. Consequently the switch 121 being in shunt or parallel relation to the switches 123 (Fig. 20), the motor continues to operate after the switch 123 is opened and until the projection 122 again opens the switch 121. This occurs when the drum 113 has made one revolution. The switches 123 are mechanically associated with switches 124 so that when one of the switches 123 is closed, the corresponding switch 124 is also closed.

The common side of the switches 124 is connected to the pole 96 and each of the switches 124 is connected to a corresponding brush 125. These brushes are mounted on strips of insulation 126 carried on the rear side of the vertical wall 110. At their inner free ends the brushes are provided with hook-like projections 127 which are adapted to engage with the longitudinal ribs 128 formed on the exterior of the metal wall 114 of the drum 113.

As best shown in Fig. 1, the ribs 128 are of graduated length and consequently the number of ribs which are engaged by any brush during one revolution depends upon the height of the brush. It may here be noted that the first five ribs 128 are full length so that the topmost brush 125 will make five contacts each time the drum 113 is given one rotation. The next brush will make six contacts and each brush in series regarded in the downward direction will make one more contact, the last, or 20th, brush making 24 contacts during each revolution.

Each pair of switches 123 and 124 is controlled by a button 129, there being a button corresponding to each record of the phonograph. The button 129 projects outwardly through the housing, as best seen in Fig. 4, and is mounted on a flat bar 130. The buttons 129 are mounted in two vertical rows and the bar 130 of each extends into a switch frame 131 of known type.

The bars 130 carry pieces of insulation 132 which in turn carry bridge pieces 133 on opposite sides of the frame 131. The bridge pieces 133 extend to the exterior of strips of insulation 134. These strips of insulation carry contacts 135. The bridge pieces 133 and the contacts 135 on each side of each bar 130 constitute the mechanically associated switches 123 and 124 previously referred to. Each switch 123 is connected to the motor and is also connected to one side of the secondary 136 of the transformer 137, which supplies filament current for the tube 138. The other side of this secondary is connected through the contact 99 and pole 97 with the other side of the motor. The transformer 137 is preferably arranged to supply 24-volt current for the motor.

Each of the switch frames 131 is provided with a locking bar 139 which is best seen in Fig. 7. It will readily be understood that when one of the bars 130 is pushed inwardly, for example the middle bar shown in Fig. 7, the associated detent 140 of the locking bar is cammed out of the opening 141 in the actuated bar 130. When the bar 130 is pushed in sufficiently, the detent 140 drops into the opening 142 in the actuated bar. The locking bar 139 is biased downwardly by a spring 143 so that the bar 130 which has been pressed inwardly is locked in its inward position until the locking bar 139 is moved upwardly. When this bar is thus moved upwardly, the bar 130 which has been pushed inwardly, or a plurality of these bars if they have been pushed inwardly, is released and the bar or bars are moved outwardly by means of springs 144 which are associated therewith.

The locking bars 139 are moved upwardly at the end of each revolution of the drum 113 by means of levers 145 which are pivotally mounted on the rear side of the wall 110 and are provided with forwardly projecting ends 146 which extend through an opening 147 in said wall. The projections 146 are adapted to be engaged by the projection 122 near the end of its rotation. This projection has an inclined lower surface which is adapted to engage and depress the projections 146.

Immediately after the projection 122 has actuated the locking bars 139 in the manner described, it engages and opens the switch 121, thereby stopping the motor 108 and leaving the remote control unit in condition for the next selection. During this final movement of the drum 113, the block 102 snaps past the ratchet wheel 90 and returns it the distance of one tooth in a counter-clockwise direction as viewed in Fig. 10. If this movement of the ratchet wheel 90 brings the pin 92 into operative contact with the lever 93, the contacts 96 and 97 are moved away from the contacts 98 and 99, respectively. To make a further selection it is necessary to insert one or more coins in order to render the motor circuit capable of being completed by one of the switches 123.

It may here be noted that if two or more of the buttons 129 are pressed inwardly, then the selection made will correspond to the largest numbers of the ribs 128 which are engaged by one of the brushes, which is the lowest brush 125.

The housing 81 is provided near its upper end with a window 148 which is adapted to be illuminated by a lamp 149. This lamp is arranged in parallel with the motor 108 and is adapted to serve as a signal that the user should not select until the motor has stopped operating. Within the housing I prefer to employ two lamps 150 which may be illuminated at all times when the machine is ready for use. These lamps are located behind two vertical rows of name plates 151. These name plates are located adjacent the buttons 129 and are intended to bear the title of the selection corresponding to the button.

The name plates 151 are carried upon louvers 152 which are best seen in Fig. 2. The rear faces of the louvers 152 are adapted to act as reflectors and to carry light from the adjacent lamp 150 to the name plate 151 immediately above it. In this way the name plates are illuminated from the rear without the transmission of glare from the lamps 150 into the user's eyes.

The transformer 137, the tube 138 and other radio apparatus of the oscillator circuit are carried on a plate 152 which depends from the shelf 89. This oscillator circuit will now be described.

The tube 138 may suitably be a 25A7G tube which comprises a pentode and a diode. The plate of the diode is connected to one of the alternating current power lines 154. The diode cathode is connected through the contacts 96 and 98, one of the switches 124, one of the brushes 125, drum 113 and plate coil 155 to the plate of the pentode. The diode cathode is also connected directly to the screen of the pentode. The plate coil 155 is connected through a high resistance 156 to the grid coil 157. The grid coil is connected through grid leak 158 to the control grid of the pentode elements of tube 138. The resistor 156 is in parallel with a condenser 159.

The other power line 160 is connected to the pentode cathode of the tube 138 through a condenser and by means of a suitable filter resistor 161 and condenser 162 to the diode cathode. The plate and grid of the pentode of tube 138 are connected through a variable condenser 163. The plate coil 155 and the grid coil 157 are inductively coupled in order to provide the feedback of energy to constitute an oscillator circuit. The oscillator circuit is tuned by the condenser 163 to the desired frequency, which may, for example, be of the order of 300 kilocycles.

The power line 154 is connected through a condenser 164 and inductance 165 to an intermediate point of the grid coil 157. The condenser 164 is sharply tuned so as to permit only oscillations of the same frequency to pass to the power lines. It will readily be understood that one of the switches 124 being closed, the oscillator circuit is completed each time the associated brush 125 engages a rib 128 on the drum 113. Consequently, a corresponding number of impulses of oscillator frequency is fed out into the power lines 154 and 160 each time the drum 113 revolves.

The oscillator circuit is as follows: Power line 154, condenser 164, inductance 165, grid coil 157, resistor and condenser 156, 159, drum 113, brush 125, switch 124, contacts 96 and 98, filter 161, 162, and power line 160. It is to be noted that owing to the high frequency of the impulses which, as indicated may be around 300 kilocycles, these impulses are damped out by the meter. They are free to pass through the wiring system on the consumer's side of the meter and, consequently, they can be picked up from any outlet on the premises. They are, therefore, fed into the electrical system at the phonograph, which will now be described.

The electrical system of the phonograph is shown in Fig. 19. It comprises a power supply unit 166, a rectifier 167 for the supply of direct current to certain relays, an amplifier 168, the phonograph motor 37 and associated apparatus previously referred to, and cetain relays which will hereinafter be described in detail.

The amplifier 168 is adapted to receive the high frequency impulses delivered by the oscillator in the remote unit and to amplify and rectify these impulses. The final result of each impulse is the energization of a gas tube 169 at the output end of the amplifier. This gas tube may suitably be a 2A4G tube and its plate is supplied with alternating current. Owing to the alternation of the plate voltage, the gas tube 169 is rendered inoperative at the termination of each impulse. Consequently, the gas tube is rendered operative for a short time when each impulse is being received. The result is that the relay 172 is energized for a corresponding number of times and the switch 173 is closed for that number of times.

On the first closure of the switch 173 the relay 174 is energized, the winding of the relay 174 being in the plate circuit of the rectifier 167. The relay 174 is a time delay relay and consequently it remains energized during a series of impulses transmitted from the oscillator in the remote control. When the relay 174 is energized, the switch 175 is closed, the switch 176 is opened and these two switches remain closed and opened during a series of impulses corresponding to a selection. When the switch 175 is closed, the relay 177 is energized, the switch 178 is closed and the switch 179 is opened.

The cathode of the tube 167 is connected to the winding of the relay 174 and to one side of the switch 175. The other side of the relay 174 is connected to one side of the switch 173. The other side of the switch 175 is connected to the winding of the relay 177. The switch 176 is connected to one side of the switch 178. The other sides of switches 173 and 178 and the winding 177 are connected to power line 160. The two switches 176 and 178 are connected together and the other side of the switch 176 is connected to the common line 180 of the solenoids 62.

One side of the switch 179 is connected to one side of the magnet 40. The other side of this magnet is connected to the common sides of the switches 173, 178 and the relay 177. The other side of the switch 179 is connected to a contact 181 which is the fifth of an arcuate series of contacts mounted on a sheet of insulating material 182. The fourth contact 183 is connected to the cancel relay 64 which in turn is connected to the contact 171 previously referred to.

Figure 14:
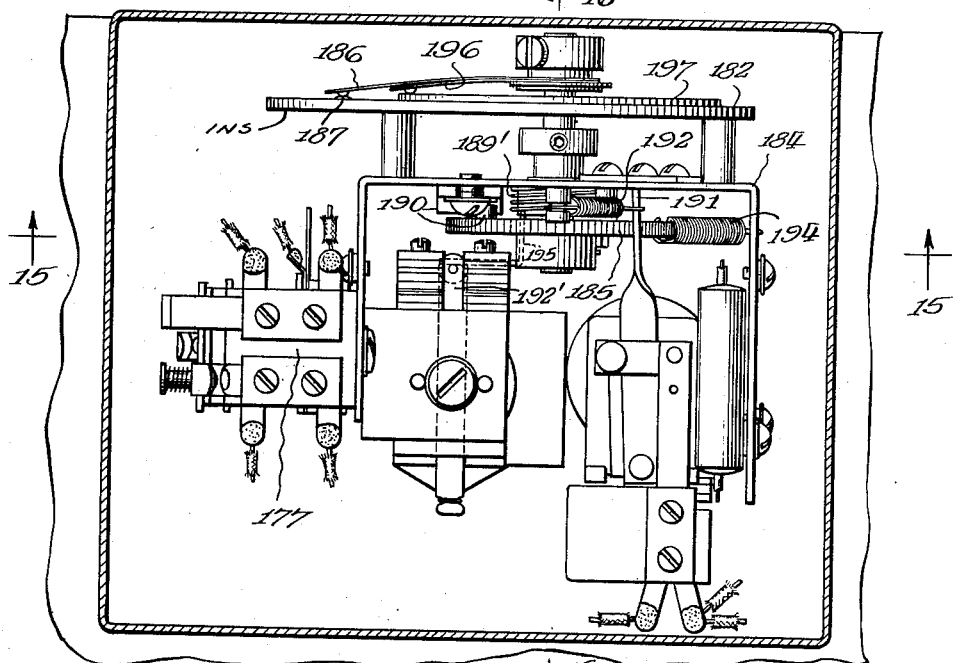
Fig. 14 is a sectional detail view showing the stepping switch which is located at the phonograph, and associated relays in plan, the section being taken on the line 14—14 of Fig. 15.
Figure 15:
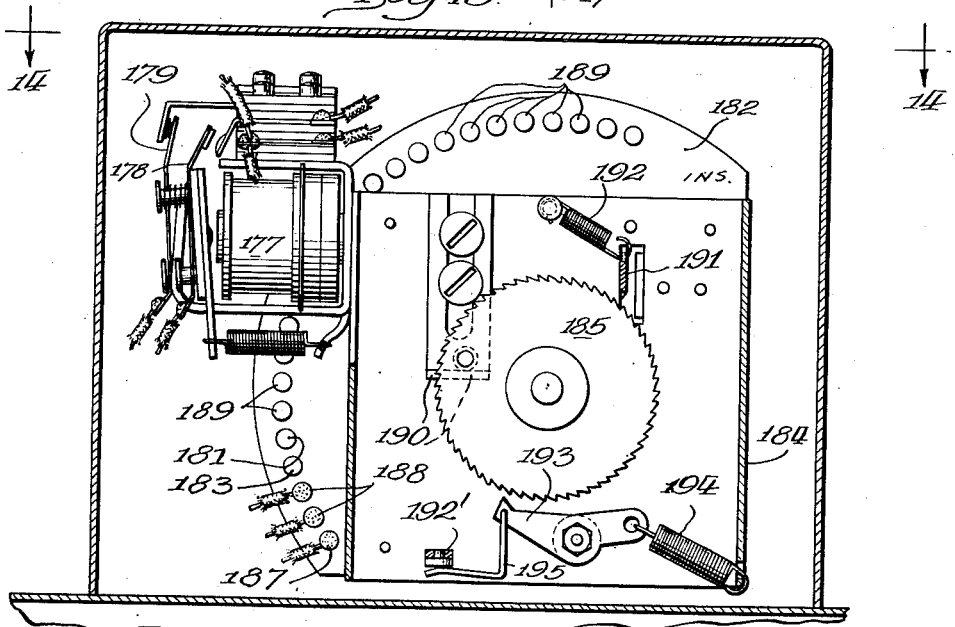
Fig. 15 is a sectional detail view, taken on the line 15—15 of Fig. 14.
Figure 16:
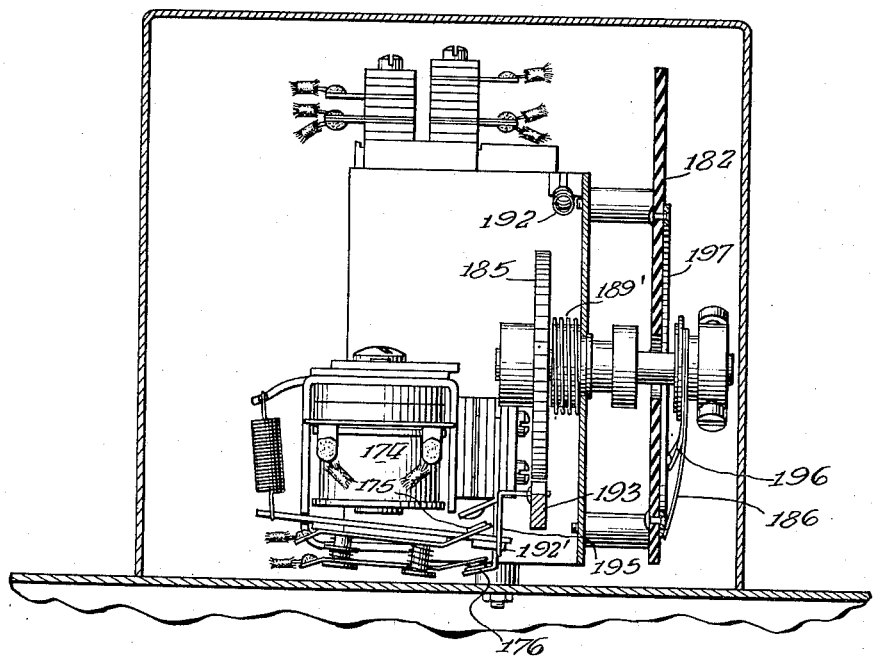
Fig. 16 is a sectional detail view, taken on the line 16—16 of Fig. 14.

The physical relation of the relays and the contacts carried on the sheet of insulation 182 is shown in Figs. 14 to 18. The relays are carried on a frame constituted by a channel member 184. Upon this frame is mounted a ratchet wheel 185, the shaft of which extends through the sheet 182. This shaft carries an arm 186 which is adapted to engage the contacts 181, 183 previously referred to, contact 187 upon which the arm 186 normally rests, two contacts 188 between 187 and 183 and the contacts 189 which correspond in number and relation to records which may be selected and also to the solenoid 62 which correspond thereto. The ratchet wheel 185 is biased in the counterclockwise direction as viewed in Fig. 15, that is, the clockwise as viewed in Fig. 18 towards initial position by a spring 189'. This initial position is defined by two stops 190, one of which is carried by the ratchet wheel, the other being mounted on the channel member 184 (Figs. 14 and 15).

Figure 17:
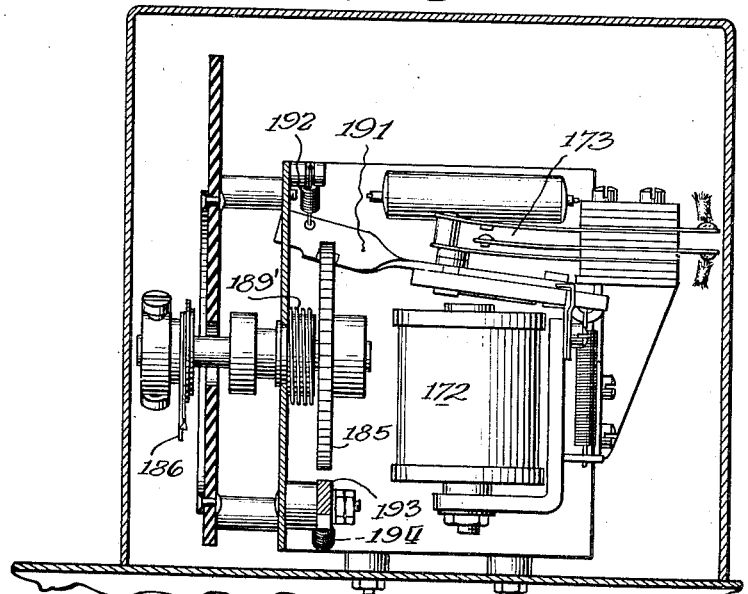
Fig. 17 is a sectional detail view, taken on the line 17—17 of Fig. 14.

The armature of the relay 172 carries an arm 191 which is adapted to move downwardly against the tension of a spring 192 each time that the relay 172 is energized. The arm 191 is adapted to cooperate with the ratchet 185 so that this ratchet is moved one tooth in the clockwise direction, as viewed in Fig. 15, during each energization. The relay 172 is associated with the switch 173 as shown in Fig. 17, this switch closing each time the relay 172 is energized. The ratchet wheel 185 is normally free to return to its initial position.

When the relay 174 is energized, an arm 192' carried by its armature moves upwardly and permits the dog 193 to be moved by a relatively weak spring 194 into engagement with the ratchet wheel 185. The dog 193 is provided with an arm 195 which extends below the arm 192'. As has previously been explained, the relay 174 is a delay relay and it remains energized during a series of impulses corresponding to a selection. Consequently, during such a series of impulses, the energization and deenergization of the relay 174 will cause the ratchet wheel 185 to advance a number of teeth corresponding to the selection.

Thus, if record No. 20 is selected, the arm 186 will be moved in stepwise fashion over contacts 183, 181 and 189 until the last contact is engaged. When the series of impulses terminates, the relay 174 is deenergized and the armature spring pulls the armature downwardly, the dog 193 is moved downwardly so that the arm 186 returns to initial position, that is into engagement with the contact 187. The shaft of the ratchet wheel 185 carries a second resilient arm 196 which engages an arcuate band of metal 197 on the sheet 182. The band 197 is connected to the power line 154. The delay relay 174 actuates the switches 175 and 176. The former is closed when this relay is energized and the latter is opened.

The frame 184 carries the relay 177. This relay actuates the switches 178 and 179, closing the former and opening the latter when the relay is energized.

The operation of the device will be readily understood from the previous description. For convenience, a brief résumé of the manner of operation of the machine will now be given. It will be understood that the phonograph itself can be operated in known manner. That is, a patron can depress any number of levers 53, corresponding to selections he desires to play. He may then insert an appropriate number of coins in the chutes 44 thereby displacing the ratchet wheel 31 a corresponding number of steps in the clockwise direction, as viewed in Fig. 11. This brings the contact 35 into engagement with the contact 36 and the motor 37 is put into operation.

The operation of the motor results in the playing of one of the selected records and when that selection is finished, the cam shaft 26 goes into operation again, effecting the replacement of the played record in the stack and the moving out of the next selected record for playing. During this revolution of the cam shaft 26, the ratchet wheel 31 is returned one step by the pin 32 in the manner previously described. The phonograph continues to play until the pin 33 is eventually brought into engagement with the lever 34. Of course, if no selections are made, the machine will play a number of records successively, corresponding to the value of the coins inserted.

When selection is made at the remote unit, or one of the remote units, the patron inserts one or more coins or coins of different value in the coin slot of the remote control unit. The result of such insertion is the energization of the magnet 86 and the displacement of the ratchet wheel 90 in the counterclockwise direction, as viewed in Fig. 10, to an extent corresponding to the number or value of coins inserted.

This brings contact 96 into engagement with contact 98, and contact 97 into engagement with contact 99, and this engagement is maintained until the shaft 105 has been rotated in the clockwise direction, as viewed in Fig. 10, for a number of times corresponding to the number of teeth by which the ratchet wheel 90 has been displaced by the insertion of coins. The shaft 105 makes one revolution each time a record is selected, and it will thus be seen that whenever the number of selections paid for have been in fact selected, further selection is rendered impossible by movement of the lever 93 by the pin 92.

Selection is made, after the ratchet wheel 90 has been energized by the insertion of coin or coins, by merely pressing one of the buttons 129 corresponding to the desired selection. This button is locked in the "in" position and thus the corresponding switch 123 and corresponding switch 124 are maintained closed. The closing of the switch 123 starts the motor 108. The motor continues to operate until the shaft 105 has made one revolution, whereupon its operation is terminated by the opening of the switch 121. The switch 123 opens while the motor 108 is in operation.

It will thus be seen that the oscillator circuit described above is completed by engagement of the corresponding brush 125 with the ribs 128 of the drum 113. The number of impulses sent out on the lines 154 and 160 thus corresponds to the position of the brush 125. Thus, selection No. 7 corresponds to eleven impulses. The result is that the gas tube 169 is energized eleven times in regular succession.

It may here be interposed that on the third energization of the relay 172, a cancelling circuit is completed. This only occurs when the ratchet wheel 31 is in the position shown in Fig. 11, that is, in its position immediately before the phonograph is put into operation. The first impulse which energizes the gas tube 169 causes the energization of relay 172. This effects the closure of the delay relay 174 which remains closed for the series of impulses. On each energization of the relay 172, the arm 186 is moved from one contact to the next. When the delay relay 174 is energized, that is during the reception of a series of impulses, the relay 177 is energized, switch 178 is closed and switch 179 is opened.

During the same time the dog 193 is maintained in operative relation to the ratchet wheel 185. The first two impulses move the arm 186 into engagement successively with the two contacts 188. It may here be noted that these dead contacts are provided in order to prevent any possibility of the phonograph being actuated by transient impulses which may pass over the power lines 154 and 160. In order for the arm 186 to reach the contact 183, it is necessary for at least three impulses to be applied in timed relation to the physical constants of the relays. On the third impulse, the arm 186 engages the contact 183 and the following circuit is completed: power line 160, contact 170, contact 171, cancelling solenoid 64, contact 183, arm 186, arm 196, band 197, power line 154.

The cancelling solenoid 64 is thereby energized. This results in the swinging of the cancelling bar 69 which physically moves upwardly any of the selector levers 53, which may have been depressed. It will be noted that this circuit is only completed when the phonograph is being put into operation. If the phonograph is in operation, the contact 170 is separated from the contact 171. Consequently it is impossible for a patron at a remote control position to cancel selections made at the machine by a patron who has already put the machine into operation.

To resume a consideration of the eleven impulses 2, 3, 4, which have been originated by the pressing of button 129 corresponding to selection No. 7 as previously mentioned, the fourth impulse brings the arm 186 into engagement with contact 181. This engagement has no effect since the switch 179 is opened. The next seven impulses move the arm 186 seven steps into engagement with the contact 189 which is connected to the solenoid 62 corresponding to record No. 7. This is the eleventh contact removed from contact 187. In these sidewise movements over the contacts 189 no current passes through any of the solenoids 62, because the switch 176 is opened. When no further impulses are received, the delay switch 174 is deenergized, the switch 175 opens and the switch 176 closes.

The opening of the switch 175 results in the deenergization of the relay 177, but this occurs a short time after the deenergization of the relay 174. Consequently, for a short time after the deenergization of the relay 174, a circuit is completed through power line 154, arm 186, the contact 188 engaged by this arm, the corresponding solenoid 62, line 180, switch 176, switch 178 and power line 160. Consequently, the solenoid 62, corresponding to the selection desired, is energized and the corresponding selector lever 53 is pulled downwardly. This circuit is promptly interrupted by the opening of the switch 178 as a result of the deenergization of the relay 177.

This deenergization also results in the withdrawal of the dog 193 from the ratchet wheel 185, and the arm 186 moves back towards initial position. In passing over the contacts 189, no circuit is completed because switch 178 is open. When the returning arm 186 engages the contact 181, a circuit is completed from the power line 154, arm 186, contact 181, closed switch 179, magnet 40 and power line 160.

The energization of the magnet 40 results in the movement of the ratchet wheel 31 one tooth in the clockwise direction, as viewed in Fig. 11. This puts the phonograph into operation to play the selected record corresponding to the depressed lever 53. When the phonograph is in operation and a further selection is made at the remote control unit, the corresponding arm 53 is moved downwardly, and the ratchet wheel 31 is moved another step in the clockwise direction. The only difference is that no circuit is completed through the solenoid 64, and the pin 33 being out of engagement with the lever 34, this lever is not moved. Thus any desired number of selections within the capacity of the machine may be made from the remote unit, or any number of remote units, which may be plugged into the power lines 154 and 160.

It will be noted that in the remote control operation of the machine, the insertion of coins in the remote control displaces the ratchet wheel 90 by a certain number of teeth. The selection of each record at the remote control discharges the ratchet wheel 90 one tooth and displaces the ratchet wheel 31 one tooth in the opposite direction. That is, credit is established at the remote control unit on the ratchet wheel 90 by the insertion of a number of coins, and this credit is transferred step by step to the ratchet wheel 31 each time a selection is made. The credit established on the ratchet wheel 31 at the phonograph is discharged step by step by the operation of the cam shaft 26 after each record is played.

Although the present invention has been described in connection with the specific details of a preferred embodiment thereof, it must be understood that such details are not intended to be limitative of the invention, except insofar as set forth in the accompanying claims.

I claim:

1. An automatic phonograph comprising a main unit, including a turntable, record changing mechanism, and motor means to drive the turntable and said record changing mechanism, a remote control unit, means for connecting both units to common power lines, an oscillator circuit in said remote control unit, interrupter means in said remote control unit adapted to supply a predetermined number of impulses of oscillator frequency to said lines, means for receiving said impulses in the main unit, and a plurality of selector means in said main unit operatively connected to said receiving means whereby one of said selector means is actuated by a certain number of said impulses, and means associated with said impulse receiving means for starting the operation of said motor.

2. An automatic phonograph comprising a main unit, a remote control unit, means for connecting both units to common power lines, an oscillator circuit in said remote control unit, a coin actuated switch in said circuit, interrupter means in said remote control unit adapted to supply a selected number of impulses of oscillator frequency to said lines, means for receiving said impulses in the main unit, and a plurality of selector means in said main unit each adapted to be operated to select a certain record to be played, a stepping relay adapted to be energized by impulses from said receiver adapted to operate a certain selector means, and a switch in said main unit adapted to be closed by said stepping relay to initiate the operation of said main unit.

3. An automatic phonograph comprising a main unit, a remote control unit, means for connecting both units to common power lines, an oscillator circuit in said remote control unit, a coin actuated magazine switch in said circuit, means including a plurality of manual control means and interrupter means in said remote control unit adapted to supply a number of impulses of oscillator frequency to said lines each time a control member is actuated, the number of impulses corresponding to the member operated, means in the main unit for receiving said impulses, a plurality of selector means in the main unit, each being adapted to be operated to select a corresponding record to be played, a stepping relay adapted to be energized by impulses from said receiver and adapted to operate a certain selector means, and a magazine switch in said main unit adapted to be energized by said stepping relay each time a manual control member is actuated.

4. An automatic phonograph comprising a main unit, a remote control unit, means for connecting both units to common power lines, an oscillator circuit in said remote unit, a magazine switch in said circuit, adapted to be energized to varying extents by the insertion of coins, means including a plurality of manual control members and automatic interrupter means in said remote control unit adapted to supply a number of impulses of oscillator frequency to said lines each time a control member is actuated, the number of impulses corresponding to the member operated, means associated with said interrupter for moving said magazine switch step by step towards opening position each time the interrupter is operated, means in the main unit for receiving said impulses, a plurality of selector means in the main unit, each being adapted to be operated to select a corresponding record to be played, a stepping relay adapted to be energized by impulses from said receiver and adapted to operate a certain selector means, a magazine switch in said unit adapted to be energized by said stepping relay each time a manual control member is actuated, and automatic means operable at the end of the playing of each record for moving last said magazine switch back step by step toward switch opening position.

5. An automatic phonograph comprising a main unit including a turntable, record changing mechanism, and motor means for driving said turntable and said mechanism, a remote control unit, means for connecting both units to common power lines, an oscillator circuit in said remote control unit, interrupter means in said remote control unit, power means adapted to drive said interrupter, a plurality of manually operable selector means, switch means actuated thereby adapted to initiate the operation of said power means, means for stopping said power means at the end of an interrupter cycle, means controlled by said manually operable selector means for supplying a predetermined number of impulses of oscillator frequency to said lines, means for receiving said impulses in the main unit, and a plurality of selector means in said main unit operatively connected to said receiving means whereby one of said selector means is actuated by a certain number of impulses, and means controlled by said impulse receiving means for starting said motor.

6. An automatic phonograph comprising a main unit, a remote control unit, means for connecting both units to common power lines, an oscillator circuit in said remote unit, a magazine switch in said circuit, adapted to be energized to varying extents by the insertion of coins, means including a plurality of manual control members, means for stopping said motor at the end of an interrupter cycle, a switch actuated by a corresponding manual control member adapted to transmit a corresponding number of impulses to the power lines, means for receiving said impulses in the main unit, a plurality of selector means in said main unit, a magazine switch in said main unit, a stepping relay in said main unit adapted to be actuated by said impulses, circuit controlling means associated with said relay operable at the end of a series of impulses to energize a corresponding selector means, means controlled by said stepping relay for energizing last said magazine switch each time said relay is actuated by a series of impulses, and means on said main unit for deenergizing last said magazine switch each time a record is reproduced.

7. In an automatic phonograph, in combination, a remote control unit and a main unit, a magazine switch having a control element in the remote unit, a magazine switch having a control element in the main unit, selector means in the main unit, selector actuating means in the remote unit, means connecting said actuating means to the first said magazine switch whereby the control element of said switch is moved step by step to open position as the actuating means is operated, means operatively connecting the selector actuating means to said selector means, and means connecting said selector means to the second said magazine switch whereby the control element of last said switch is moved step by step from open position as the selector means is operated.

8. In an automatic phonograph, in combination, a remote control unit and a main unit, means including a pair of conductors connecting said units, a magazine switch having a control element in the remote unit, means for effecting movement of the control element of said switch from switch open position to desired extent, selector actuating means in the remote unit adapted to effect movement of the control element of said magazine switch stepwise towards switch open position on each operation of the selector actuating means, selector means in the main unit operatively connected through said wires to the selector actuating means to be operated thereby, a magazine switch having a control element in the main unit, and means in the main unit adapted to move last said control element of the second said magazine switch stepwise away from switch open position on each operation of the selector means.

9. In an automatic phonograph, in combination, a main unit including a turntable, record changing mechanism, and a motor for driving said turntable and said mechanism, and a remote control unit, conductor connecting said units, means in said remote control unit for producing high frequency alternating current, motor driven switching means, a plurality of circuits cooperating with said switching means to impart a definite and variable number of impulses of said current to said conductor, a plurality of switch members selectively controlling said circuits, a plurality of record playing selector means in said main unit, means responsive to variable series of impulses for selectively actuating said selector means, and means responsive to said impulses for starting said motor.

10. In an automatic phonograph, in combination, a main unit including a turntable, record changing mechanism, and a motor for driving said turntable and said mechanism, and a remote control unit, a conductor connecting said units, means in said remote control unit providing high frequency alternating current, switch means in said remote control unit comprising a rotating drum, a plurality of bars on the drum, certain of same being of varying length, and a plurality of brushes adapted to engage varying numbers of ribs as the drum rotates, means for rotating the drum one revolution, and a plurality of switches adapted selectively to connect said brushes to said conductor whereby a selected number of impulses of said current is communicated to said conductor, a plurality of means in the main unit, each responsive to a different number of impulses and adapted selectively to control the playing of a record therein, and means responsive to said impulses for starting said motor.

11. In an automatic phonograph, in combination, a main unit and a remote control unit, a conductor connecting said units, selector means on the main unit for selecting records to be played, means on the remote control unit for actuating said selector means, means for cancelling said selector means, and means effective when said phonograph is inoperative and actuated by said means in the remote control unit for operating said cancelling means.

12. In an automatic phonograph, in combination, a main unit and a remote control unit, a conductor connecting said units, a main switch on the main unit controlling the operation of the phonograph, selector means on the main unit for selecting records to be played, means on the remote control unit for actuating said selector means and opening said switch, means for cancelling said selector means, and means controlled by said main switch, effective when said switch is open, to render said cancelling means operable by said selector actuating means on the remote unit.

13. In an automatic phonograph, in combination, a remote control unit and a main unit, a conductor connecting said units, a magazine switch in said remote unit, coin controlled means for energizing said switch to desired extent, a plurality of selector actuating means in the remote unit, adapted on each operation to deenergize said magazine switch stepwise, means controlled by said selector actuating means for supplying a definite number of electrical impulses to said conductor, a magazine switch on the main unit controlling the operation of the phonograph and adapted to be energized stepwise by each series of impulses, means on the main unit for returning last said magazine switch stepwise towards open position each time the phonograph reproduces a record, and a plurality of selector means on the main unit each responsive to a different number of impulses and effective to select a different record for playing.

14. In combination, an automatic phonograph, switch means for starting the phonograph, a thermionic tube having a plate circuit and a control element, means in said plate circuit for controlling said switch means, and a control unit comprising means to vary the potential of said control element to effect a change of the plate current to actuate said switch means.

15. In combination, an automatic phonograph, switch means for starting the phonograph, a thermionic tube having a plate circuit and a control element, means in said plate circuit for controlling said switch means, a control unit comprising means to vary the potential of said control element to effect a change of the plate current to actuate said switch means, and means operated by the phonograph for actuating said switch means.

16. In combination, an automatic phonograph, switch means for starting the phonograph, means responsive to a plurality of electrical impulses for actuating said switch means, control means for producing said impulses, and means operated by the phonograph for actuating said switch means.

17. In a phonograph, in combination, a plurality of selector members each corresponding to and controlling an individual recording, a motor adapted to operate said phonograph, a circuit controlling said motor, switch means controlling said circuit, and a control unit for said phonograph comprising selector means adapted to produce a plurality of series of impulses each corresponding to an individual recording to be played, means for receiving said impulses and means individual to each series of impulses and responsive thereto for actuating the corresponding selector member and conditioning said switch means for controlling the playing of the record selected.

18. In combination, an automatic phonograph, switch means for starting the phonograph, individual selector means corresponding to recordings on the phonograph adapted individually for operation whereby a plurality of selections may be selected, a thermionic tube having a plate circuit and a control element, means in said plate circuit for controlling said switch means, a control unit comprising means to vary the potential of said control element to effect change of the plate current for a definite selected number of times to actuate said switch means and actuate a corresponding one of said selector means.

19. In combination, an automatic phonograph, switch means for starting the phonograph, a plurality of individual selector means each adapted to control the playing of a corresponding recording, means responsive to a plurality of electrical impulses for actuating a selected one of said selector means and actuating said switch means, and selective control means for producing a desired number of said impulses.

20. In combination, an automatic phonograph adapted to play a series of recordings, magazine means adapted to be actuated to control the playing of the phonograph a desired number of times, individual selector means adapted to be actuated to control the playing of corresponding recordings, and remote control means adapted simultaneously to actuate said magazine means and a selector means, for a plurality of times, whereby the phonograph is conditioned for the playing of a desired number of selected recordings.

21. In combination, an automatic phonograph including a turntable, record changing mechanism, and a motor for driving said turntable and said record changing mechanism, a remote control unit for said phonograph, common power leads supplying electrical energy to both said phonograph motor and said control means, means in said remote control unit for supplying a series of impulses of radio frequency energy to said power leads, means in said phonograph adapted to receive said impulses, and means controlled by last said means for initiating the operation of the phonograph motor.

22. In combination, an automatic phonograph including a motor, a remote control unit therefor, means in said remote control unit for transmitting a series of impulses of radio frequency energy, means in said phonograph adapted to receive said impulses, and means controlled by last said means for initiating the operation of the phonograph motor.

23. In combination, an automatic phonograph, a plurality of actuable selector members each corresponding to an individual recording and adapted to control the playing of said recording, means for retaining a plurality of said selector members in actuated position whereby the recordings corresponding thereto are reproduced in sequence, a solenoid operatively connected to each selector member, a stepping relay adapted to complete a circuit to any of said solenoids, and means for supplying a series of impulses to said stepping relay to control the energization of the corresponding solenoid.

24. In combination, an automatic phonograph, a plurality of actuable selector members each corresponding to an individual recording and adapted to control the playing of said recording, means for retaining a plurality of said selector members in actuated position whereby the recordings corresponding thereto are reproduced in sequence, a solenoid operatively connected to each selector member, a stepping relay adapted to complete a circuit to any of said solenoids, means for supplying a series of impulses to said stepping relay to control the energization of the corresponding solenoid, and means associated with said stepping relay for returning said selector members to normal position.

25. In a remote control for automatic phonographs, manually operable means corresponding to the recordings of said phonograph, means for producing a series of impulses, a motor, means controlled by each of said manually operable means for starting said motor and controlling the number of said impulses, and a coin controlled switch for rendering said motor operable and inoperable by said manually operable means.

26. In a selector for an automatic phonograph, a stepping relay, means for supplying a desired number of impulses to said stepping relay, a plurality of contacts on said stepping relay corresponding to a plurality of recordings to be selected, electromagnetic means associated with each of said contacts, each electromagnetic means being arranged to control the playing of an individual recording, said stepping relay including an arm normally spaced from said contacts by a definite plurality of steps, whereby a plurality of impulses is necessary to bring the arm into engagement with the first of said contacts and a greater number is necessary to bring the arm into engagement with any of the other of said contacts and impulse-controlled means closing a circuit through said arm and the contact and electromagnetic means determined by the last of said impulses.

27. In a control unit for automatic phonographs, in combination, a plurality of push buttons, an electric motor, switch means associated with each button adapted to start the motor, a magazine switch in series with said motor, coin-controlled means for actuating said magazine switch to desired extent, a switch controlled by said motor in parallel with first said switch means, and means actuated by the motor for controlling said magazine switch.

28. In a selector for automatic phonographs, in combination, a stepping relay adapted to control the selection of any recording on the phonograph including a movable arm, a series of contacts adapted to be engaged thereby, a ratchet member, a holding dog, and an actuating dog, a plurality of electromagnetic means connected individually to said contacts, each electromagnetic means being arranged to control the playing of an individual recording, a delay relay for rendering said holding dog operative, a relay responsive to a series of impulses for operating said actuating dog to move said ratchet member and said movable arm to a selected predetermined position, a switch responsive to last said relay adapted to control said delay relay, a normally open switch adapted to be closed by said delay relay and maintained closed during a series of impulses, a normally closed switch controlled by said delay relay adapted to be held open during a series of impulses, a relay controlled by said normally open switch, a normally open switch controlled by last said relay in series with said normally closed switch, a conductor connecting one of said switches in series to said electromagnetic means and connecting the other to the source of energy, whereby said arm is moved into engagement with the selected one of said contacts by a series of impulses, whereupon the circuit is completed through said contact and through the corresponding electromagnetic means during the short interval between the deenergization of the delay relay and the deenergization of last said relay.

JAMES A. BOYAJIAN.